United States Patent [19]

Ueha et al.

[11] Patent Number: 4,885,499

[45] Date of Patent: Dec. 5, 1989

[54] ULTRASONIC DRIVEN TYPE MOTOR

[75] Inventors: Sadayuki Ueha, Machida; Minoru Kurosawa, Yokohama; Michiyuki Masuda, Nagoya, all of Japan

[73] Assignee: NGK Spark Plug Co., Inc., Japan

[21] Appl. No.: 308,816

[22] Filed: Feb. 10, 1989

[30] Foreign Application Priority Data

Feb. 12, 1988 [JP] Japan ............................. 63-31427

[51] Int. Cl.$^4$ ............................................. H01L 41/08
[52] U.S. Cl. ................................... 310/328; 310/333; 310/325
[58] Field of Search ............... 310/316, 317, 323, 325, 310/328, 333

[56] References Cited

U.S. PATENT DOCUMENTS

| | | | |
|---|---|---|---|
| 4,210,837 | 7/1980 | Vasiliev et al. | 310/323 |
| 4,663,556 | 5/1987 | Kumada | 310/323 X |
| 4,705,980 | 11/1987 | Mishiro | 310/325 X |
| 4,728,843 | 3/1988 | Mishiro | 310/325 |
| 4,764,702 | 8/1988 | Mishiro | 310/323 |
| 4,812,697 | 3/1989 | Mishiro | 310/323 |

FOREIGN PATENT DOCUMENTS

| | | | |
|---|---|---|---|
| 3433768 | 4/1985 | Fed. Rep. of Germany | 310/323 |
| 0113672 | 6/1985 | Japan | 310/323 |
| 0148387 | 8/1985 | Japan | 310/323 |
| 0052163 | 3/1986 | Japan | 310/323 |
| 0054883 | 3/1986 | Japan | 310/323 |
| 0196773 | 8/1986 | Japan | 310/323 |
| 0060480 | 3/1987 | Japan | 310/323 |
| 0060481 | 3/1987 | Japan | 310/323 |
| 0092779 | 4/1987 | Japan | 310/323 |
| 0095981 | 5/1987 | Japan | 310/323 |
| 0217875 | 9/1987 | Japan | 310/323 |
| 670992 | 6/1979 | U.S.S.R. | 310/325 |

*Primary Examiner*—Mark O. Budd
*Attorney, Agent, or Firm*—Mason, Fenwick & Lawrence

[57] ABSTRACT

An ultrasonic driven type motor in which an ultrasonic torsional vibrator is activated to generate a forward turning torque for driving a rotor synchronously with the expansion of at least one piezoelectric actuator provided between the vibrator and the rotor, and to generate a return turning torque synchronously with the constriction of the piezoelectric actuator, and the piezoelectric actuator has a coupling control characteristic so that only the forward turning torque is selectively transmitted to the rotor.

5 Claims, 5 Drawing Sheets

FIG.5
FIG.6
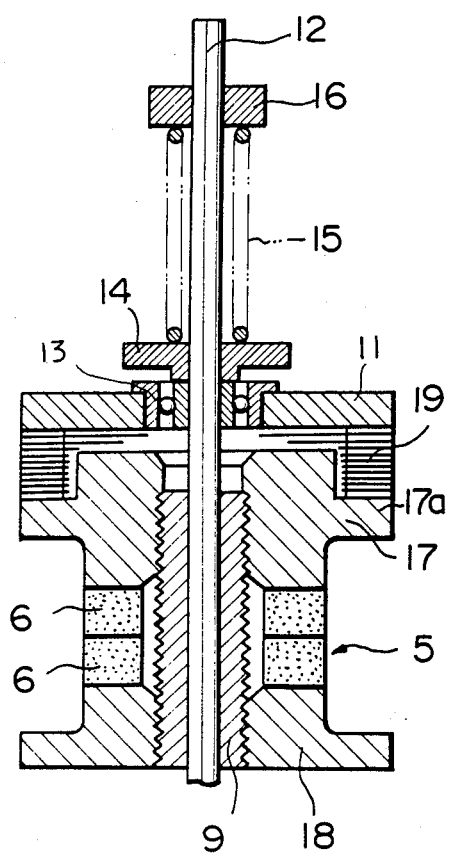
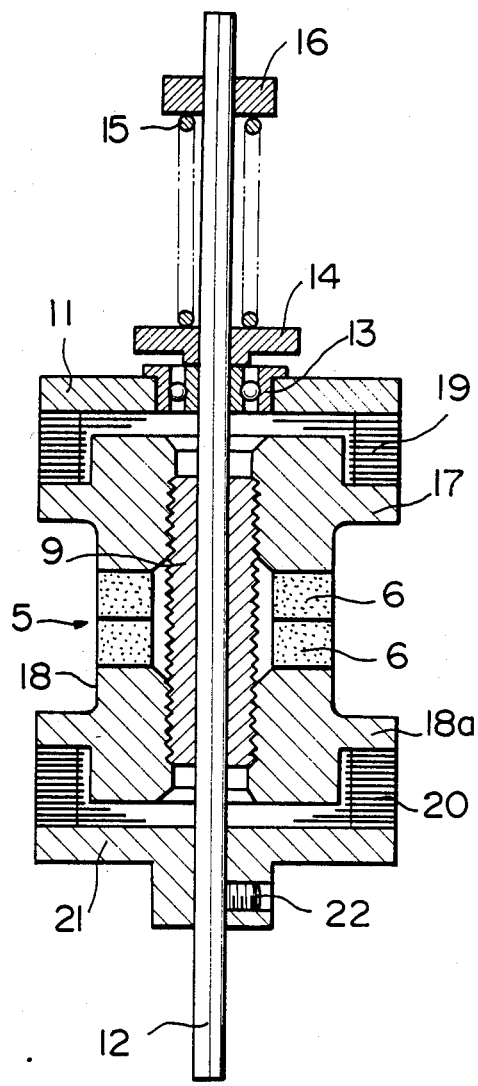

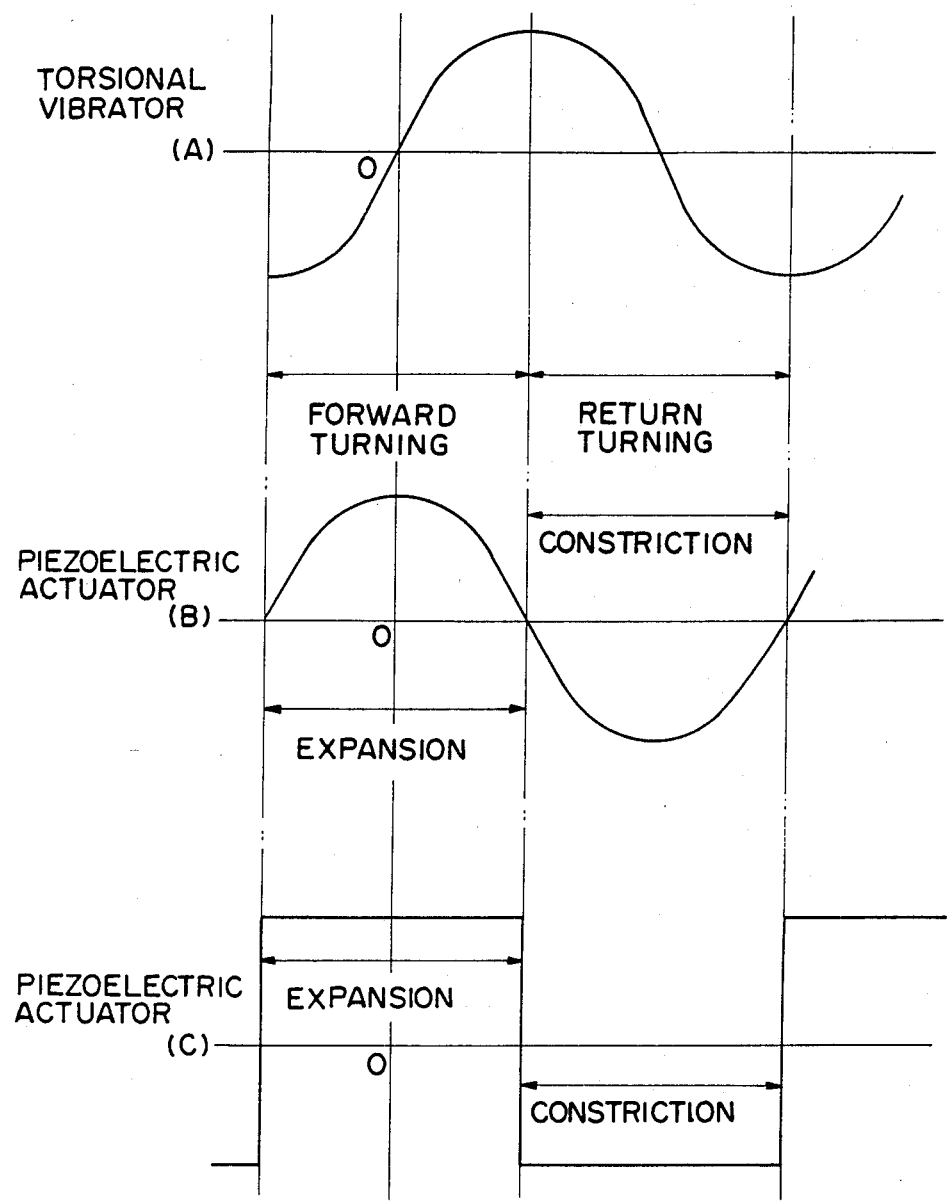

ULTRASONIC DRIVEN TYPE MOTOR

BACKGROUND OF THE INVENTION

The present invention relates to an ultrasonic wave driven type motor in which a rotor is operated by an ultrasonic vibration to generate a driving force.

Various ultrasonic torsional vibration elements are known in which an annular or disc piezoelectric element is used as a vibrating source for generating a torsional vibration. Such ultrasonic torsional vibration elements are disclosed in Japanese Patent Publication Nos. 3633/76 and 14156/77 and Japanese Patent Kokai Nos. 120677/86 and 120678/86.

For example, Japanese Patent Publication No. 14156/77 discloses a torsional vibrator comprising a plurality of annular or ring-shaped piezoelectric elements each of which is sequentially and partially polarized in the peripheral direction, and the piezoelctric elements are electrically connected in parallel and are mechanically tightened to each other by metal blocks.

Japanese Patent Kokai No. 96882/84 discloses an ultrasonic driven type motor which comprises a stator including a piezoelectric vibrator used as a driving means, and a rotor arranged to be rotatd by the stator. In such a conventional ultrasonic driven type motor, the stator is of an annular shape, to which driving voltage of multiphase is applied for generating a traveling wave, and the rotor is rotated by the generated traveling wave.

With such a conventional ultrasonic driven type motor, however, the control of the applied voltage is complicated, and the generation and adjustment of the driving force are performed only by means of a resonance. Therefore, the conventional motor of the kind mentioned above has disadvantages that it has little adaptability in its design, and the design therefor becomes troublesome.

SUMMARY OF THE INVENTION

It is therefore an object of the present invention to provide an ultrasonic driven type motor using an ultrasonic torsional vibrator as a stator, which is capable of overcoming the problems or disadvantages of the conventional motor arrangements.

Another object of the present invention is to provide an ultrasonic driven type motor which can easily be manufactured with a larger degree of freedom in design.

According to the present invention, there is provided an ultrasonic driven type motor comprising an ultrasonic torsional vibrator having at least two annular piezoelectric elements for producing torsional vibrations of opposite peripheral direction, a rotor, at least one laminated piezoelectric actuator provided between said vibrator and said rotor for selectively transmitting a driving force generated from the torsional vibrations of said vibrator to said rotor, and means for applying AC voltages to said ultrasonic torsional vibrator and said laminated piezoelectric actuators to occur a displacement having predetermined phase difference.

According to a preferred embodiment, a plurality of laminated piezoelectric actuators may be provided on the end surface of the ultrasonic torsional vibrator with equal angular interval, and the rotor may arranged to be abutted on the end portion of said laminated piezoelectric actuators.

The ultrasonic torsional vibrator is intended to generate a torsional resonance at the peripheral edge portion thereof, thereby producing reciprocal turning forces.

Each of the laminated piezoelectric actuators may be constructed by a lamination of a plurality of piezoelectric elements which are electrically connected in parallel, and the top end portion thereof may be displaced in an non-resonant sense by applying of a voltage. It will be appreciated that the displacement of the top end portion of each actuator may occur by the superimposition of distortions in the respective piezoelectric elements.

The ultrasonic torsional vibrator and the laminated piezoelectric actuators are fed with AC voltages. By applying of the AC voltages when the laminated piezoelectric actuators are expanded to bring into contact with the rotor, the forward turning force generated by the ultrasonic torsional vibrator is transmitted to the rotor. When the ultrasonic torsional vibrator is turned in a return direction or backward direction, the laminated piezoelectric actuators are contracted so that they are disengaged from the rotor, thereby retaining the rotor free from the return turning force. In this way, the ultrasonic torsional vibrator is intended to give the forward force or rotating torque to the rotor, and the laminated piezoelectric actuators are intended to control the coupling with the rotor. The rotor may be driven in a predetermined direction by means of the continuous ultrasonic torsional vibration.

The present invention will now be described by way of example with reference to the accompanying drawings:

BRIEF DESCRIPTION OF THE DRAWINGS

FIG. 5 is a schematic sectional view showing another embodiment of the present invention;

FIG. 6 is a schematic sectional view showing a further embodiment of the present invention;

FIG. 9 is a diagram of a displacement of the ultrasonic torsional vibrator and piezoelectric actuators in the motor according to the present invention.

DETAILED DESCRIPTION

Figure 1:
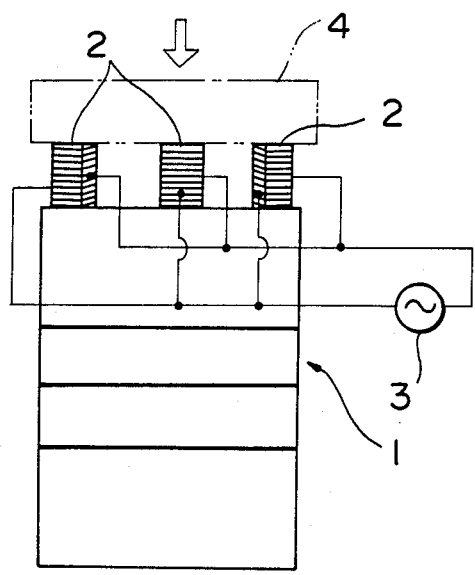
FIG. 1 is a plan view schematically showing a principle of an ultrasonic driven type motor according to the present invention.
Figure 2:
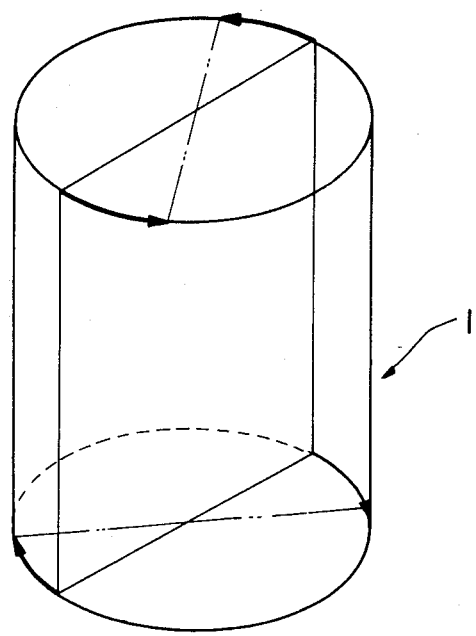
FIG. 2 is a perspective view showing a torsional vibration mode of an ultrasonic torsional vibrator.

Referring now to FIGS. 1 and 2, there is shown an essential construction of an ultrasonic driven type motor according to the principle of the present invention.

The reference numeral 1 represents an ultrasonic torsional vibrator 1 on one end surface of which piezoelectric actuators 2 are provided. Each of the piezoelectric actuators 2 is formed of a number of laminated piezoelectric elements. The respective piezoelectric actuators 2 are electrically connected in parallel to a power source 3. A rotor 4 is positioned on the one end of the respective actuators 2. The ultrasonic torsional vibrator 1 and the respective actuators 2 are operated by in-phase alternating voltages.

When being energized, the piezoelectric actuators 2 are axially in an non-resonant sense expanded or contracted in response to the applied voltage, and the ultrasonic torsional vibrator 1 is twisted in opposite peripheral directions at the both ends as shown in FIG. 2. That is, when the piezoelectric actuators 2 are axially expanded to be closely contacted with the rotor 4, the ultrasonic torsional vibrator 1 gives a forward turning force produced at its one end surface into the rotor 4. The displacement of each of the ultrasonic torsional vibrator 1 and piezoelectric actuators 2 is shown by (A) and (B) in FIG. 9, respectively. The ultrasonic torsional vibrator 1 subsequently produces a return turning force at its one end surface into the rotor 4. However, this return turning force is not transmitted to the rotor 4 because at that time the piezoelectric actuators 2 are axially contracted to be moved away from the rotor 4.

Figure 3:
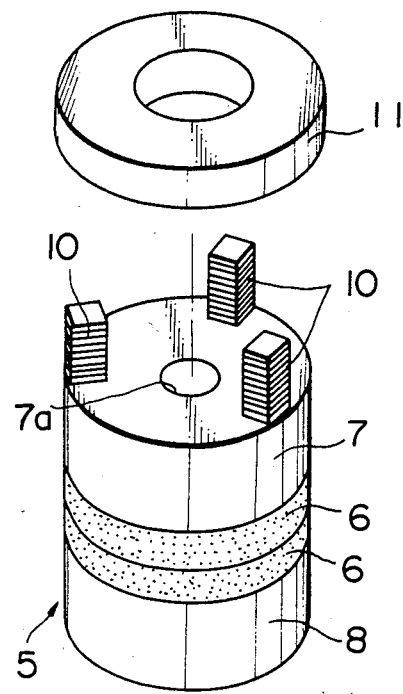
FIG. 3 is an exploded perspective view of essential portions in one embodiment of an ultrasonic driven type motor according to the present invention.
Figure 4:
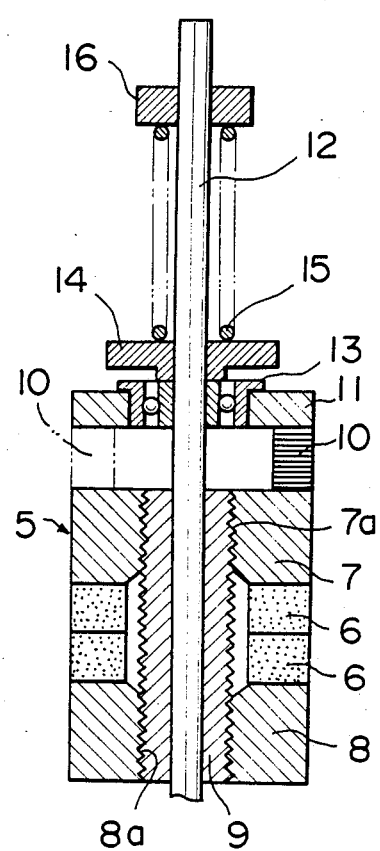
FIG. 4 is a schematic longitudinal section showing the assembled ultrasonic driven type motor.

FIGS. 3 and 4 show one embodiment of the present invention. The reference numeral 5 represents an ultrasonic torsional vibrator which comprises two annular piezoelectric elements 6 superimposed one after the other and metal blocks 7 and 8 for retaining the annular piezoelectric elements 6. Each piezoelectric element 6 is made of $PbZrO_3$-$PbTiO_3$ type or the other piezoelectric materials, and is polarized in a peripheral direction so that these piezoelectric elements 6 produce torsional vibrations in peripheral directions which have opposite phases to each other. As shown in FIG. 4, the metal blocks are provided with threaded center bores 7a and 8a, respectively, into which a tubular bolt 9 is screwed for tightening the metal blocks 7 and 8.

On the upper surface of the metal block 7 are provided three laminated piezoelectric actuators 10 which are disposed with equal angular interval along the periphery. Each piezoelectric actuator 10 comprises a number of laminated piezoelectric elements which are connected in parallel to each other. When being energized by the applied voltage, each piezoelectric element is subjected to a longitudinal distortion. As the result of the longitudinal distortions produced in the respective piezoelectric elements, the top end portion of each piezoelectric actuator is axially displaced.

A disk-shape rotor 11 is mounted on a shaft 12 via a bearing 13 so that the rotor 11 is positioned on the actuators 10. The shaft 12 is extended through the tubular bolt 9. The bearing 13 is slidably mounted on the shaft 12. On the shaft 12 is also slidably mounted a pushing flange 14 which is contacted with the inner ring of the bearing 13 and is forced toward the bearing 13 by a spring 15 inserted between the pushing flange 14 and a retainer 16 fixed to one end of the shaft 12. Therefore, the rotor 11 is elastically contacted with the piezoelectric actuators 10 by the action of the spring 15.

With the illustrated embodiment, AC voltage is applied to the annular piezoelectric elements 6 in the vibrator 5, and AC voltage which is in-phase with respect to the phase of the first mentioned voltage is applied to the piezoelectric actuators 10. When the piezoelectric actuators 10 are axially expanded, the torsional vibrator 5 is simultaneously twisted in a forward peripheral direction. On the other hand, when the actuators 10 are axially contracted, the torsional vibrator 5 is simultaneously twisted in a backward or return peripheral direction. As a result, upon the expanding of the actuators 10 the coupling force between them and the rotor 11 is sufficient to transmit the forward turning force to the rotor 11, but upon the contracting of the actuators 10 the coupling force becomes reduced not to transmit the return turning force to the rotor 11. Within a high frequency range, even if the rotor 11 is forced against the piezoelectric actuators 10 by means of the spring 15, the return turning force to the rotor 11 may be eliminated and thus only the forward turning force may be transmitted to the rotor 11. In this way, the rotor 11 continues to rotate in a forward direction.

It is found that an effective driving force for the rotor 11 can be produced if phase shifting between the AC voltages for actvating the vibrator 5 and the respective actuators 10 is set to the range of $-30°$ and $30°$.

In the above mentioned operation, the top portion of the each actuator 10 makes an elliptical orbit. In order to effectively control the coupling operation between the piezoelectric actuators and the rotor, as shown by (C) in FIG. 9 a rectangular pulse voltage may be used for activating the actuators. The applied voltage should be controlled in such a manner that the coupling between the actuators and the rotor is maintained during the period from the commencement of the forward twisting to the commencement of the return twisting of the vibrator. As a result, the forward twisting force in the vibrator may effectively be transmitted to the rotor through the respective actuators.

FIG. 5 shows a modification of the motor illustrated in FIGS. 3 and 4, the illustrated motor 5 has substantially the same structure as that shown in FIGS. 3 and 4 except that flanged annular members 17 and 18 are used for retaining the annular piezoelectric elements 6 interposed therebetween, and a ring-shaped piezoelectric actuator 19 is provided instead of rectangular piezoelectric actuators. Therefore, the same reference numerals as those in FIGS. 3 and 4. In this modification, the ring-shaped piezoelectric actuator 19 is fixed on the outer flange 17a of the annular member 17.

It will be seen from FIG. 2 that the peripheral strain being produced by the twisting of the vibrator is larger in the outer portion than the inner portion. This embodiment has an advantage that the ring-shaped piezoelectric actuator 19 can be positioned on the relative outer position in radial dirction so that the rotor can be subjeted to a larger amount of the peripheral feeding or turning per a vibration cycle. Since the ring-shaped piezoelectric actuator 19 has a larger contact surface, the slipping which may occur between the rotor and the actuator can sustantially be reduced, and thus the efficiency of the tansmission of the turning torque from the actuator to the rotor can be improved.

FIG. 6 shows another embodiment of the present invention, in which another ring-shaped pizoelectric actuator 20 is provided on the flange 18a of the annular member 18 and is retained by a retainer 21. This retainer 21 is fixed on the shaft 12 by a screw 22. In this arrangement, the upper and lower ring-shaped piezoelectric actuators 19 and 20 are energized with opposite phase powers so that when one of these actuators 19 and 20 is expanded the other actuator is constricted or vice versa. When the ultrasonic torsional vibrator 5 can twisted, the peripheral displacement of the upper actuator 19 becomes twice by setting the retainer 22 as a stationary base, and thus the rotor 11 can be driven at velocity twice that of the previously illustrated embodiments. Alternatively, by designing the retainer 21 as a rotor, it is possible to take out a rotating output from the retainer 21, whose direction is opposite to that from the rotor 11.

Figure 7:
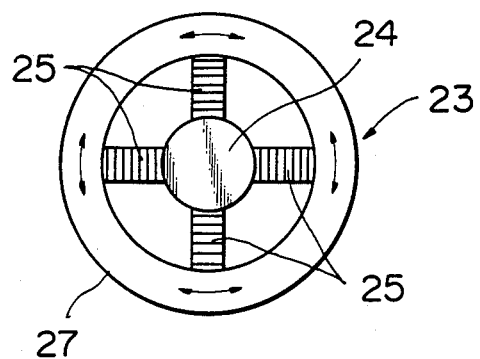
FIG. 7 is a schematic plan view showing a still further embodiment of the present invention.
Figure 8:
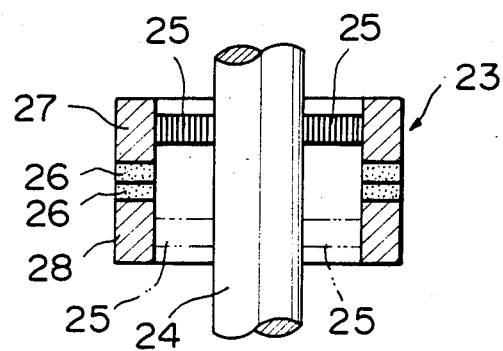
FIG. 8 is a partial longitudinal section of the motor in FIG. 7.

FIGS. 7 and 8 show a further embodiment of the present invention. Reference numeral 23 denotes a cylindrical ultrasonic torsional vibrator into which an output shaft 24 is concentrically inserted. Four piezoelectric actuators 25 are radially disposed between the inner surface of the vibrator 23 and the outer peripheral surface of the output shaft 24. These actuators 25 are positioned around the output shaft 24 with equal angular interval. One end of the each actuator 25 is fixed to the inner surface of the vibrator 23, and the other end abuts on the outer peripheral surface of the output shaft 24. In order to transmit the rotation torque from the vibrator 23 to the output shaft 24 without any substantial loss, the end surface of the other end of the each actuator 25 has a configuration corresponding to that of the outer peripheral surface of the output shaft 24.

The vibrator 23 has substantially the same structure as that illustrated in the embodiment of FIGS. 3 and 4. That is, it comprises two ring-shaped piezoelectric elements 26, and upper and lower metal rings 27 and 28 between which the piezoelectric elements 26 are retained. Upon energizing, the end portions of the vibrator 23 are twisted in a peripheral direction to generate a forward turning torque and a return turning torque alternately, and the respective piezoelectric actuators 25 are radially expanded and contracted alternately. The energizing of the vibrator 23 and the actuators 25 can be controlled so that the radial expansion of the each actuator 25 occurs synchronously with the forward turning torque generation in the vibrator 23, while the radial contraction of the each actuator 25 is synchronous with the return turning torque generation in the vibrator 23. Therefore, only the forward turning torque acts on the output shaft 24, but no return turning torque acts thereon.

With the illustrated embodiment, alternatively, the each actuator 25 may be supported by the output shaft 24. In that case, the inner end portion of each actuator 25 may be fixed to the outer peripheral surface of the output shaft 24, and the outer end portion may abut on the inner surface of the vibrator 23.

Further, while four piezoelectric actuators are provided in the upper portion of the vibrator in the illustrated embodiment, it is possible to provide additional four piezoelectric actuators in the lower portion of the vibrator as shown by a dotted line in FIG. 8.

In all of the illustrated embodiments, by reversing the expansion-constriction timing of the piezoelectric actuator a reversed rotation output can easily be obtained from the rotor or output shaft.

As mentioned hereinbefore, according to the ultrasonic driven type motor of the present invention, the vibrator is activated to generate a forward turning torque for driving the rotor or output shaft synchronously with the expansion of the piezoelectric actuator, and to generate a return turning torque synchronously with the constriction of the piezoelectric actuator. The piezoelectric actuator has a coupling control performance so that only the forward turning torque is selectively transmitted to the rotor or output shaft. Therefore, as compared with the conventional vibration wave driven type motor which requires a multi-phase voltage as in an annular stator, the control of the voltage for driving the motor can easily be performed only by setting the driving timing of the torsional vibrator and the piezoelectric actuator(s). Since the ultrasonic torsional vibrator is operated in a resonance mode and the laminated piezoelectric actuator(s) is operated in an non-resonance mode, the motor can easily be manufactured with a larger degree of freedom in design, thereby providing motors of various types such as a very small type motor.

It is to be understood that the above-mentioned embodiments are only illustrative of the application of the principles of the present invention. Numerous modifications and alterations may be made by those skilled in the art without departing from the spirit and scope of the invention, and the appended claims are intended to cover such modifications and alterations.

What is claimed is:

1. An ultrasonic driven type motor comprising an ultrasonic torsional vibrator having at least two annular piezoelectric elements for producing torsional vibrations of opposite peripheral direction, a rotor, at least one laminated piezoelectric actuator provided between said vibrator and said rotor for selectivity transmitting a driving force generated from the torsional vibrations of said vibrator to said rotor, and means for applying AC voltages to said ultrasonic torsional vibrator and said laminated piezoelectric actuators to occur a displacement having predetermined phase difference.

2. An ultrasonic driven type motor according to claim 1, wherein each of said piezoelectric actuator is of a pillar-shape, a plurality of said pillar-shape piezoelectric actuators are fixed at one ends thereof to the end surface of said torsional vibrator with equal angular interval, and the other end of said each piezoelectric actuator abuts on said rotor.

3. An ultrasonic driven type motor according to claim 1, wherein each of said piezoelectric actuator is of a pillar-shape, said rotor comprises an output shaft positioned coaxially in said torsional vibrator, a plurality of said pillar-shape piezoelectric actuators are radially disposed around said output shaft with equal angular interval and are fixed at one ends thereof to the inner peripheral surface of said torsional vibrator, and the other end of said each piezoelectric actuator abuts on said output shaft.

4. An ultrasonic driven type motor according to claim 1, wherein said piezoelectric actuator is of a ring shape, and is fixed at one end thereof to the end surface of said torsional vibrator, and the other end of said piezoelectric actuator abuts on said rotor.

5. An ultrasonic driven type motor according to claim 1, wherein when said said piezoelectric actuator is expanded to be press-contacted with said rotor, the driving force generated from the torsional vibrations of said vibrator is transmitted to said rotor.

* * * * *